June 29, 1926.
M. L. PATTERSON
1,590,543
FEED CONTROL MEANS FOR ARC LIGHTS
Filed June 21, 1921    3 Sheets-Sheet 1
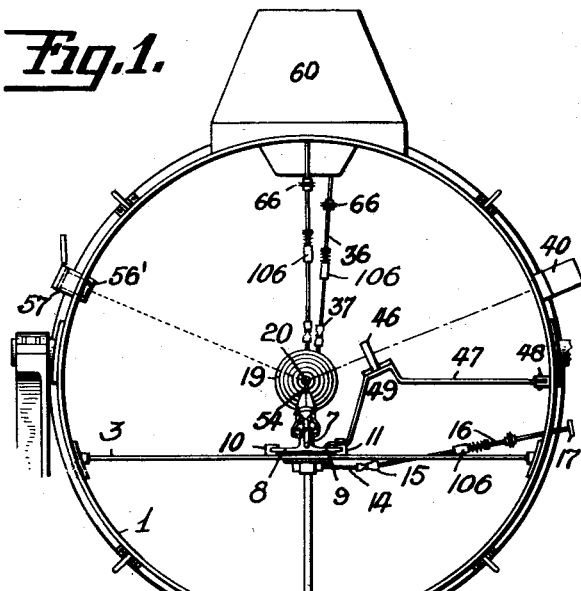
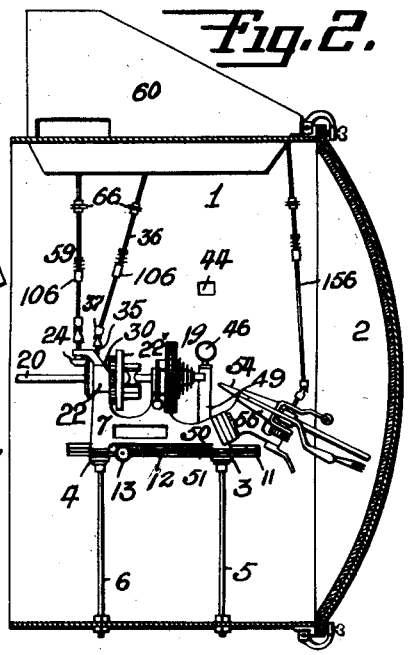
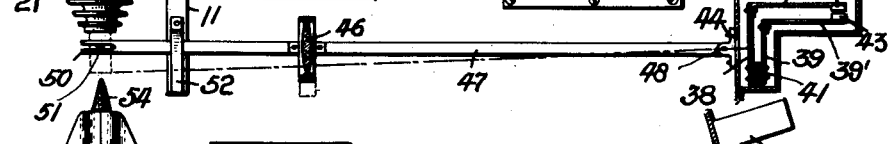
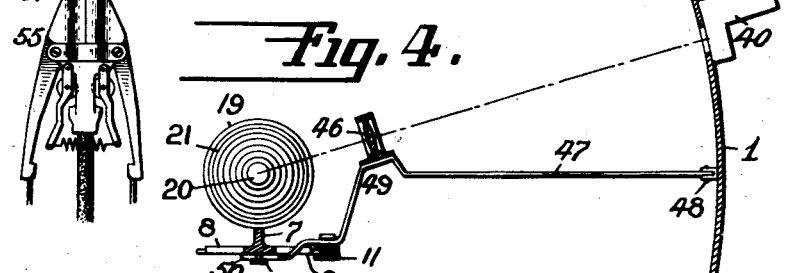
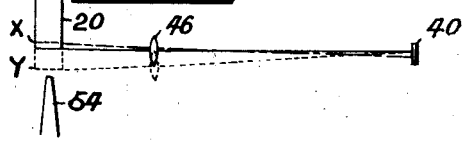
Inventor
MARTIN L PATTERSON
By his Attorney
Herbert H. Thompson June 29, 1926.
M. L. PATTERSON
FEED CONTROL MEANS FOR ARC LIGHTS
Filed June 21, 1921     3 Sheets-Sheet 2
1,590,543
Fig. 7.
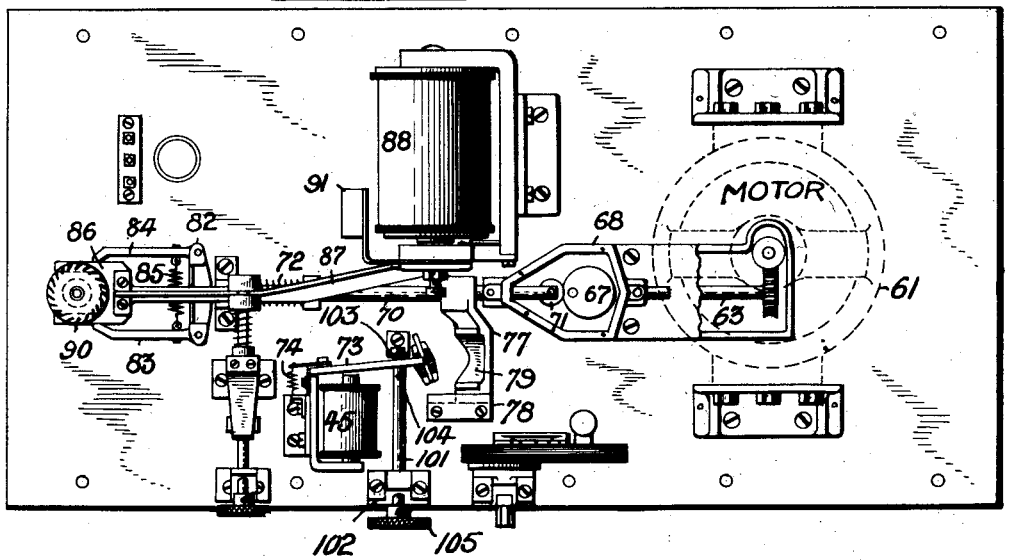
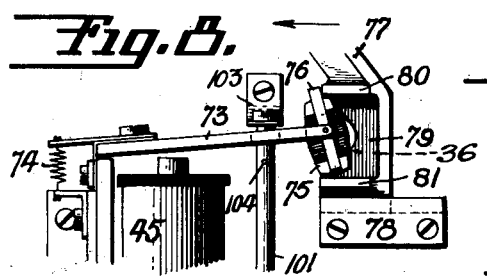
Fig. 8.
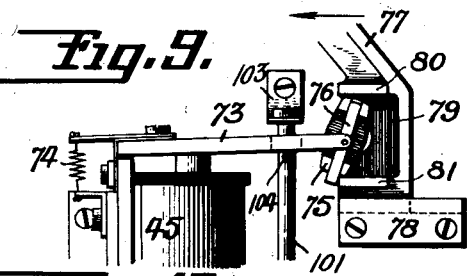
Fig. 9.
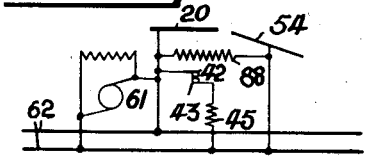
Fig. 12.
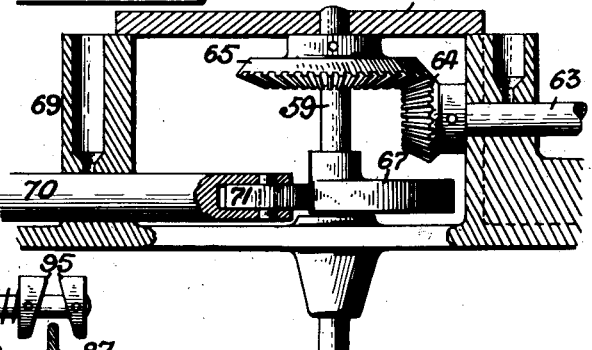
Fig. 10.
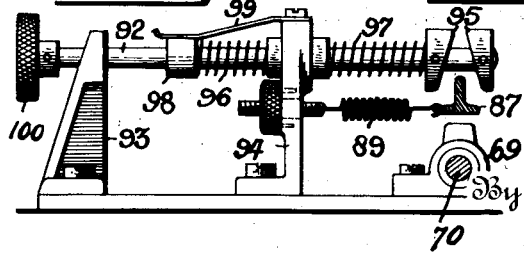
Fig. 11.
Inventor
MARTIN L PATTERSON
By his Attorney
Herbert H. Thompson

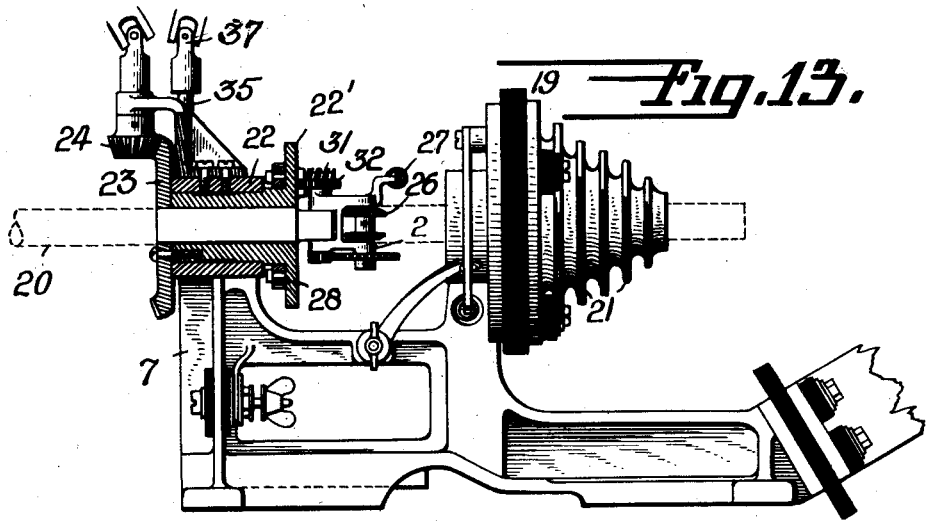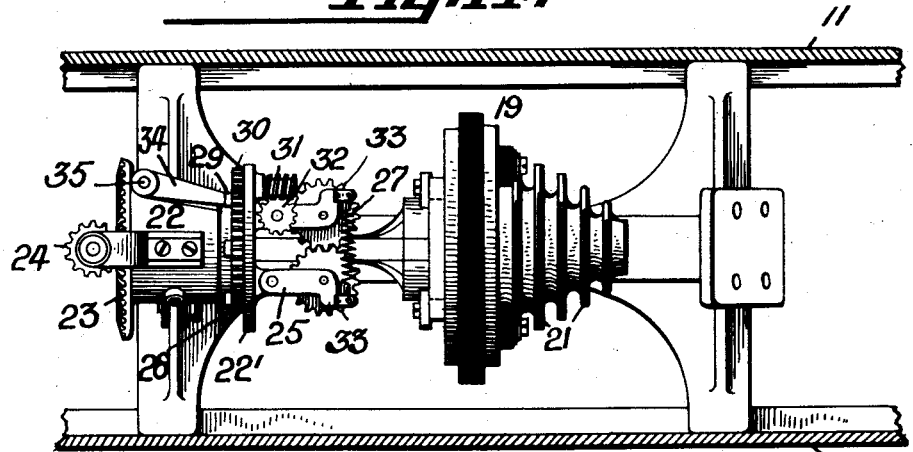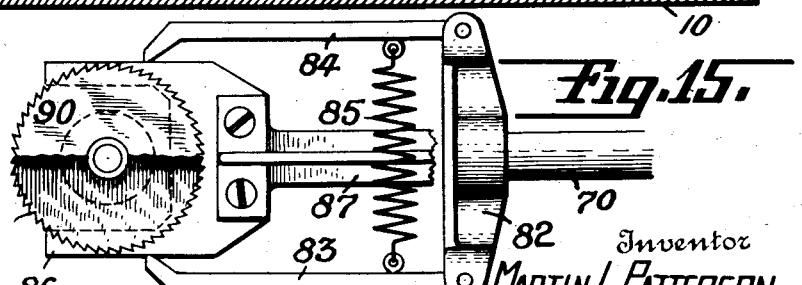

Patented June 29, 1926.

1,590,543

UNITED STATES PATENT OFFICE.

MARTIN L. PATTERSON, OF BOGOTA, NEW JERSEY, ASSIGNOR TO THE SPERRY GYROSCOPE COMPANY, OF BROOKLYN, NEW YORK, A CORPORATION OF NEW YORK.

FEED-CONTROL MEANS FOR ARC LIGHTS.

Application filed June 21, 1921. Serial No. 479,201.

This invention relates to means for controlling the feeding of electrodes in arc lights. In searchlights or other light projecting apparatus of the high intensity arc type it is customary to maintain the crater of the positive electrode, which crater constitutes the principal light source, at the focal point of a suitable light projector or condenser. For this purpose a thermostat has been mounted at a distance from the positive electrode in a position to receive a beam of light from the crater of said electrode. The burning away of said positive electrode results in changing the position of the crater and light beam with respect to the thermostat and the latter thereupon closes a circuit to control mechanism to feed the positive electrode forwardly to its proper position. Where the holder for said electrode is adjustably mounted with respect to said thermostat and is moved to shift the positive crater away from the focal point of the projector, for example to diverge the projected beam, the beam of light directed upon the thermostat is shifted with respect thereto. It frequently happens that when said holder is shifted in one direction the electrode burns back so far as to bring the arc flame into contact with the holder before the thermostat acts to cause forward feeding of the electrode, and damage to the holder thus results. If the holder is shifted in the other direction, although forward feeding of the positive electrode commences before said holder is damaged, said feeding frequently continues until said electrode is brought so close to the holder for the negative electrode that the arc jumps from the positive electrode to said negative holder, with resultant injury to the latter. Also the positive electrode spindles much more than desired when it projects too far in front of its holder.

One of the objects of this invention is to provide means whereby the adjustment of the positive electrode holder with respect to the thermostat will not affect the operation of said thermostat, so that whenever said holder is moved to any desired position the crater of the positive electrode will be automatically held in its new position and will be maintained at a definite distance from the holder in any of a plurality of positions of the latter. Where the electrode holders are mounted on a control box slidable with respect to the searchlight drum, this result has been attained by mounting the thermostat in the control box. However, by means of my invention, the aforesaid result may be accomplished in those types of searchlights and projector lights which employ no control box or in which the thermostat is not mounted in a control box, and in which the electrode holders are mounted for adjustment with respect to the thermostat.

Another object is the provision of an improved type of electrode feed control wherein the work performed by a control magnet in governing the operation of the feeding means is reduced to a minimum.

A further object is to provide a novel and efficient means for throwing out of action the automatic control of the feeding of the negative electrode and for manually controlling such feeding.

Other objects and advantages will appear as the description of the invention is hereinafter developed.

Referring to the drawings wherein I have shown what I now consider to be the preferred form of my invention, Fig. 1 is a front elevation of a searchlight provided with my invention.

Fig. 2 is a side elevation of parts shown in Fig. 1, the searchlight drum and projector being shown in vertical section.

Fig. 3 is a plan view showing a portion of my invention on an enlarged scale, certain parts appearing in section.

Fig. 4 is an elevation looking toward the holder for the positive electrode in Fig. 3, certain parts being shown in vertical section.

Fig. 5 is a diagrammatic view illustrating the principle of operation of my invention.

Fig. 6 is a detail view showing a ground glass finder for viewing the arc flame and for enabling the operator of the lamp to position the positive crater at the focal point of the projector.

Fig. 7 is a plan view of the mechanism on top of the searchlight drum for controlling the feeding of the electrodes.

Figs. 8 and 9 are detail views illustrating different positions of the mechanism for controlling the feeding of the positive electrode.

Figs. 10 and 11 are views of details of the mechanism shown in Fig. 7.

Fig. 12 is a wiring diagram.

Fig. 13 is a side elevation, partly in section, of the positive electrode holder.

Fig. 14 is a top view of the same showing the slide ways.

Fig. 15 is a plan view on a larger scale of the pawl and ratchet mechanism shown in Fig. 7.

The electrodes and part of the lamp mechanism in connection with which I have shown my invention are shown mounted within a drum 1 at the rear of which is mounted the light projector or condenser 2. The drum may be provided with the usual transparent front but is shown open at its front end. Extending across the drum are suitable cross bars 3, 4, which are secured at their ends to the inner circumference of the drum and are supported adjacent their centers by standards 5, 6, respectively, mounted on the bottom of the drum. A base member 7 is provided with arms 8, 9 extending from opposite sides thereof and fitting into suitable slideways 10, 11, respectively, which slideways are supported on cross bars 3, 4. For shifting member 7 on said slideways, rack teeth 12 may be provided on the bottom of said member. Meshing with said teeth is a pinion 13 rotatable with a shaft 14 which is mounted in suitable bearings fixed within drum 1. The shaft 14 is connected through a suitable universal joint 15 with a shaft 16 which projects through the searchlight drum to the outside thereof and is provided with a knob 17. By turning the knob 17 in the proper direction it will be seen that the member 7 may be moved either forwardly or rearwardly within the drum. In Fig. 2 the slideways above mentioned are omitted to show clearly the rack teeth 12 and pinion 13.

The base member 7 serves as a holder for the positive electrode 20, which electrode is mounted in and extends through a sleeve or head 19 mounted in the upper portion of said member. Head 19 is shown provided with fins 21 for expediting the radiation of heat from said electrode. As is customary in high intensity arc lamps means are provided for continuously rotating the positive electrode and for feeding said electrode forwardly in response to the burning away thereof to maintain the positive crater at the focal point of the projector. One form which said mechanism may assume is shown in Fig. 3 and may be constructed and arranged substantially as follows:

Rotatably mounted in the upper portion of member 7 is a sleeve 22 through which the electrode 20 extends. For rotating said sleeve a bevel gear 23 is fixed thereto and meshes with a bevel pinion 24 driven by a motor on the top of the drum 1, as will more fully appear hereinafter. Pivotally connected to a disk 22' rotatable with sleeve 22 are arms 25, each provided with a roller 26. A spring 27 serves to bring arms 25 into such position that the electrode 20 is firmly gripped between the rollers carried by said arms. Since said arms and rollers are carried by sleeve 22 it will be seen that rotation of said sleeve results in rotation of electrode 20. Loosely journaled on sleeve 22 but normally rotatable therewith is a gear wheel 28 provided with axially extending projections 29. A pinion 30 carried by disk 22' meshes with gear 28. A worm 31 is rotatable with pinion 30, and meshes with a wormwheel 32, which in turn drives rollers 26 about their own axes of rotation through certain intermeshing gears 33. It will be seen from this construction that as long as gear 28 rotates with sleeve 22 the rollers 26 merely turn with said sleeve about the axis of rotation of the latter. If, however, gear wheel 28 be held against rotation, pinion 30, being carried around said gear wheel by the rotation of sleeve 22, will be turned about its own axis of rotation, thereby turning worm 31. Motion is thereby communicated thru wormwheel 32 and gears driven thereby to rollers 26, whereby the latter are turned about their own axes of rotation and feed the electrode 20 forwardly. Such forward feeding of the electrode continues as long as gear 28 is held against rotation while sleeve 22 is rotating. For preventing rotation of said gear 28 I have shown an arm or projection 34 carried by a rod 35, which rod is rotatably journaled in the upper portion of member 7 adjacent sleeve 22 and may be turned to move said arm 34 into the path of the projections 29. Rod 35 is connected thru a suitable universal joint 37 with a rod 36, which rod is turned by mechanism later to be described, which mechanism is located on top of the searchlight drum and is controlled by a thermostat mounted in a casing 40 on the side of said drum.

One form of thermostat which may be employed is shown in Fig. 3 and comprises sensitive thermostatic strips 38, 39, insulated from each other at 41 and attached at their free ends to suitable strips 38', 39', the latter carrying at their free ends contacts 42, 43. Said sensitive strips 38 and 39 are each composed of a pair of metals having different coefficients of linear expansion, so that upon a rise in temperature each strip will buckle and tilt the contact connected to it. Thus, when the temperature of the surrounding medium rises, each strip will buckle and contacts 42 and 43 will be tilted in the same direction so that no circuit will be closed. Upon the falling of rays from the positive crater, however, through the aperture 44 in the searchlight drum and upon strip 38, strip 39 being shielded from said rays by strip 38, the latter strip will buckle more rapidly than strip 39 and will bring contact 42 into engagement with contact 43. As shown in Fig. 12, contacts 42, 43 are in circuit with an electro-magnet 45 on the top of the drum. The engagement of said contacts closes a circuit through said electro-magnet 45, which magnet controls the turning of rod 36, as will appear more fully hereinafter. A lens 46 is interposed between the positive crater and thermostat and serves to direct rays from said crater upon the strip 38 when said crater departs from a predetermined position. Normally said crater is positioned at the focal point of the reflector 2, and as the positive electrode burns away and said crater hence departs from said focal point, rays from said crater are concentrated by lens 46 upon thermostatic strip 38. Said rays, as long as the crater is in its proper position, are directed by the lens to one side of aperture 44 and hence cannot fall upon strip 38, but as soon as the crater burns back from its proper position a predetermined amount said rays are directed by the lens upon said strip and magnet 45 is thereupon energized with resultant turning of arm 34 into the path of projections 29 and consequent feeding of electrode 20 forwardly. Such feeding continues until the positive crater again reaches its proper position. In Fig. 5 the path of rays from the positive crater through lens 46 when said crater is in its proper position is indicated in full lines, while the dot and dash lines indicate the path of said rays when said crater burns back to position X. In the latter case the rays are directed through the aperture 44, as shown in Fig. 4.

It is sometimes desired to position the positive crater at a distance from the focal point of projector 2, as for example, to diverge the beam. This may be done, of course, by turning handle 17 and thereby moving the base member or holder 7. In previous designs of searchlight where the thermostat is mounted on the drum, such adjustment of the electrode holder to move the positive crater has frequently resulted in damage. For example, the shifting of the electrode holder to move the positive crater away from the focal point and toward the projector would cause the rays passing through the lens to be shifted further from the thermostat, so that the positive electrode would burn away until the arc flame arrived dangerously near to or touched the positive head 19 before any forward feeding took place. Damage to the head 19 thus resulted. On the other hand, shifting the electrode holder to move the positive crater from the focal point of reflector 2 and away from said reflector would result in forward feeding of the electrode 20 to such an extent that the arc flame would touch or come dangerously near the holder 55 of the negative electrode before the rays passing through the lens would be moved out of contact with the thermostatic strip. I have provided means whereby the position of the positive crater may be adjusted at the will of the operator without affecting the operation of the thermostat, so that, whenever the position of said crater is adjusted by the operator, said crater will be automatically maintained in its new position. Thus, at all times, whether adjusted out of the focal point of the projector 2 or not, the positive crater will be automatically held at a point at a given distance from the tip of the positive head 19, and its departure from such point by burning away of the crater will result in closing of the thermostatic circuit to feed the electrode forwardly and bring the crater back to said point. The means which I have provided for this purpose comprises a connection between the electrode holder and lens 46, and may be constructed and arranged substantially as follows:

Said lens 46 is mounted on a bar 47, which bar is pivoted at 48 to the drum 1 below opening 44 and at its other end is connected with member 7 for movement thereby. Said bar is shown provided with an intermediate angular portion 49 which forms a seat for the lens. The end of said bar which is connected with member 7 is shown forked at 50, and within said fork fits a pin or projection 51 which extends downwardly from the bottom of said member 7. Adjacent said fork 50, the bar 46 passes between the upper surface of slideway 11 and the under surface of a suitable strip 52 secured to said slideway.

From the construction above described it will readily be seen that movement of member 7 will cause movement of bar 47 about its pivotal connection 48, and that thereby lens 46 will be moved to prevent the said movement of member 7 from causing shifting with respect to the thermostat of the rays that pass through said lens. For example, if the member 7 is adjusted to move the positive electrode to position Y in Fig. 5, the lens 46 is moved to the dotted line position so that rays passing from the crater through said lens are projected by the lens to the same position with respect to opening 44 as when the positive crater occupied the full line position in said Fig. Thus, when said crater is in its full line position, the path of rays through the lens is indicated by the full line, and when said crater is moved to position Y, the path of said rays is indicated by the dotted line. In each case the rays terminate at the same point with respect to the thermostat, so that the latter is unaffected by the shifting of the electrode and its holder. At the same time the change in position of the positive crater due to burning away of the electrode results in a shift of the rays so that the latter are brought upon the sensitive thermostatic strip and thereby a circuit is closed to feed the positive electrode back to its proper position. The crater of the positive electrode is thus maintained at a given distance in front of the head 19, as well as at a given distance from the holder 55 of the negative electrode, since the latter is secured to member 7.

The position of the positive crater may be observed through a finder comprising a ground glass plate 56 and a suitable lens 56' mounted within a casing 57 on the side of the searchlight drum. The lens 56' projects on the ground glass plate 56 an image of the arc. A line 58 is provided on the surface of said plate 56 which line indicates the position of the positive crater when the latter is at the focal point of the projector 2. In Fig. 6 is shown the appearance of the arc when viewed through said finder. If the positive crater, when viewed thru said finder, is coincident with line 58 said crater is at the focal point of the projector. By observing the position of said crater with respect to said line and manipulating handle 17 said crater may be adjusted accurately with respect to said focal point, or to either side of the latter, as desired.

The negative electrode 54 is fed forwardly to maintain constant the length of the arc, by means of a rod 156 which is controlled from mechanism on top of the drum. The specific means actuated by said rod for feeding the negative electrode through its holder forms no part of my invention and will not be described here. Such means may, for example, be of the type shown in the application of Theodore Hall, Serial No. 319,382, filed August 23, 1919, for "searchlights"; or in the patent to Elmer A. Sperry, No. 1,362,575, December 14, 1920, for "feeding mechanism for searchlights."

The mechanism on top of the drum for actuating the rods 156 and 36, as well as the rod 59 that turns the bevel pinion 24, is shown in Fig. 7. Normally said mechanism may be protected by a suitable housing 60. A motor 61, indicated in dotted lines in Fig. 7, is connected across the mains 62 (Fig. 12) and is continuously energized during the operation of the light, and thereby continuously rotates a shaft 63. The latter, as shown in Fig. 10, carries a bevel pinion 64 which meshes with a bevel gear 65 secured to the upper end of the shaft 59 that turns pinion 24. The shafts 16, 36, 156, and 59 are shown comprising sections separated by suitable insulating disks 66.

Shaft 59 carries adjacent its upper end a cam 67, which turns continuously with said shaft during operation of the motor 61. The gears 64, 65 and cam 67 may be housed within a suitable casing 68 on the top of the drum, as shown in Fig. 10. Slidably mounted in one wall of said casing and in a bearing 69 is a rod 70 which carries at one end a roller 71. A spring 72 presses rod 70 to the right in Fig. 7 and maintains the roller 71 in engagement with cam 67. It will thus be seen that said rod 70 is continuously reciprocated during the operation of the motor 61. I make use of this reciprocation of rod 70 to actuate, not only the rod 156 to feed the negative electrode, but also, the shaft 36 for feeding the positive electrode.

The electro-magnet 45, which is in circuit with the thermostat (Fig. 12), is adapted when energized to attract an armature 73, which armature is maintained by a spring 74 in the position shown in Figs. 7 and 8 when said magnet is de-energized. In order that said magnet may be required to do the least possible work in turning shaft 36 I have devised means whereby the actual turning of said shaft is performed by the motor 61, through rod 70, in response to the position of armature 73. Such means may assume the form shown in Figs. 7, 8, and 9, and constructed substantially as follows:

The upper end of shaft 36 is provided with a yoke 75, within which yoke fits slidably a slide 76 pivoted to armature 73. The slide 76 thus forms a floating connection between said yoke and said armature, and is of such length that it projects from one side or the other of said yoke, depending upon whether magnet 45 is energized or de-energized. In the latter case the slide 76 assumes the position shown in Figs. 7 and 8. If, now, magnet 45 is energized, slide 76 will be moved to project from the other side of the yoke 75, and will be engaged by an arm 77 secured to rod 70 for reciprocation thereby. Said arm 77 is guided at one end in a suitable slideway 78 and is provided with a depressed portion 79 of a size suitable for receiving yoke 75 during the movement of said arm. Projections 80, 81, on opposite sides of said depressed portion, are adapted to engage the projecting end of slide 76 to turn the rod 36. Thus, when the slide 76 is moved by the attraction of armature 73, the yoke 75 being in the position shown in Fig. 9 projection 81 will engage the projecting end of said slide 76, as arm 77 is reciprocated, and will turn the yoke 75 and rod 36 to move arm 34 into the path of projections 29. Fig. 9 shows the yoke 75 turned by projection 81 as the result of the attraction of armature 73, the arm 77 having reached the limit of its movement in the direction of the arrow and being about to move in the opposite direction. Yoke 75 now remains in this position, and forward feeding of the positive electrode consequently occurs, until the thermostatic circuit is opened and armature 73 consequently retracted by spring 74. Slide 76 is now moved to extend into the path of movement of projection 80, and yoke 75 is thereby turned back into its position shown in Fig. 7, thereby turning rod 36 to remove arm 34 from the path of projections 29 and causing the feeding of the positive electrode to cease. In Fig. 8 the yoke 75 is shown turned by projection 80 as the result of the de-energization of magnet 45, the arm 77 having reached its limit of movement in the direction of the arrow. It will thus be seen that by the above-described means, the magnet 45 is not required to do any work outside of merely moving its armature, and that the actual work in turning rod 36 is performed by the motor 61. Magnet 45 can thus be made considerably smaller than would otherwise be necessary.

For turning the shaft 156 to feed the negative electrode, the rod 70 may carry at one end a cross-bar 82 to which two pawls 83, 84 are pivoted. A spring 85 connects said pawls and causes the same to be pressed into engagement with a block 86 carried at one end of the member 87 connected to the armature of a magnet 88. Said magnet is connected across the arc, as shown in Fig. 12, and is hence responsive to the voltage across the arc, and therefore to the length of the latter. A spring 89 (Fig. 11) is connected to member 87 and opposes the pull of magnet 88 upon said armature. When the arc is of the proper length the pull of said magnet just balances that of spring 89 and maintains said armature in its neutral position, wherein block 86 prevents pawls 83, 84 from engaging either of the ratchet wheels carried by shaft 156. One of said ratchet wheels is shown at 90 it being understood that beneath said ratchet wheel is a second ratchet wheel having teeth directed oppositely to those of wheel 90' (see Fig. 15). One of pawls 83, 84, is adapted to engage one of said wheels to turn shaft 156 to feed the negative electrode in one direction, while the other of said pawls is adapted to engage the other of said ratchet wheels to feed said electrode in the opposite direction. Arrangements of pawls and ratchets similar to that above described for feeding the negative electrode are known in the art, being shown, for example in the above referred to application of Theodore Hall, and in the above mentioned patent to Elmer A. Sperry. Further description of such mechanism is hence unnecessary. It will be understood that when member 87 is moved in one direction from its neutral position, one of pawls 83, 84, engages its corresponding ratchet wheel and that movement of said armature in the opposite direction from neutral position results in engagement of the other of said pawls with its ratchet wheel. The negative electrode is thus fed in one direction or the other depending upon the direction in which armature 87 is moved from neutral position. Furthermore, the amount of feed for each reciprocation of rod 70 depends upon the distance to which said armature moves from its neutral position, since the depth of the grip of the pawls on the teeth of the respective ratchet wheels varies with such distance. A counter balance weight 91 is shown attached to armature 87 for preventing movement of said armature away from magnet 88 in response to tilting of the searchlight drum.

In Figs. 7 and 11 is shown a convenient type of means for manually regulating the feed of the negative electrode. A rod 92 is rotatably and slidably journaled in brackets 93, 94 on top of the drum and carries at one end a pair of collars 95 having oppositely inclined faces. The armature 87 has a portion extending between said collars, as shown clearly in Fig. 11. With the parts in the position shown in Fig. 11, said armature is free to move in response to variations in the voltage across the arc. By turning rod 92, however, so that the narrowest portion of the gap between collars 95 is brought over member 87, said armature is not free to move in response to said variations in voltage and the automatic control of the feed of the negative electrode may thus be rendered ineffective. The negative feed may now be regulated by hand by moving rod 92 in one direction or the other, which results in movement of armature 87 and the consequent feeding of the negative electrode in the desired direction. A compression spring 96, interposed between bracket 94 and a collar 98 on rod 92, opposes longitudinal movement of said rod in one direction; and a similar spring 97, interposed between bracket 94 and one of collars 95 on rod 92, opposes longitudinal movement of said rod in the opposite direction, whereby said rod is centralized longitudinally. A flat spring 99 attached to bracket 94 and bearing on collar 98 may be employed to hold rod 92 in any position to which it may have been turned. A suitable handle 100 on said rod serves for the convenient turning of the latter. The collar 98 is provided with diametrically opposed flattened portions for cooperation with spring 99. One of such portions is engaged by spring 99 when rod 92 is turned to bring the widest portion of the gap between collars 95 over armature 87, and the other portion is engaged by said spring when the rod 92 is turned to bring the narrowest parts of said gap over said armature. Said flattened portions thus indicate when either the narrowest or the widest portion of the gap between collars 95 is brought adjacent the armature 87.

In case it should be desired to control by hand the turning of shaft 36 and consequent feeding of the positive electrode, the following means may be provided. A rod 101 is slidably mounted in a bearing 102 and is attached at one end to the upwardly extending end portion of a leaf spring 103. The armature 73 extends above rod 101. By sliding said rod in one direction, armature 73 being in the position shown in Fig. 7, the armature 73 will be moved by the upper end portion of leaf spring 103 to bring arm 76 into the path of movement of projection 81 for actuation thereby. When the armature 73 is in the position shown in Fig. 9, and rod 101 is moved in the direction opposite to that above specified, said armature will be moved by a pin or projection 104 carried by rod 101, to bring arm 76 into the path of movement of projection 80 for actuation thereby. The turning of rod 36 may thus be conveniently controlled manually. Normally, rod 101 is centralized by spring 103 in the position shown in Fig. 7. Said rod may be provided with a knob 105 for the convenient manipulation thereof.

The rods 16, 36, 59 and 156 may be telescopic for permitting the adjustment of the member 7 and associated parts with respect to the drum 1. For this purpose each rod may be provided with a slidable spring pressed sleeve 106 fitting slidably and nonrotatably over separated sections of the rod, as will be readily understood. By sliding any of said sleeves a sufficient distance against the action of its spring, the sections of the corresponding rod may be disconnected whenever desired.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combinations and relations described, some of these may be altered and others omitted without interfering with the more general results outlined, and the invention extends to such use.

Having described my invention, what I claim and desire to secure by Letters Patent is:

1. In an arc light, an electrode holder, a thermostat, means for directing a beam of light from the crater of the positive electrode upon said thermostat, means controlled by said thermostat for feeding the positive electrode through said holder in response to burning away of said positive electrode, means for shifting the electrode holder with respect to said thermostat and means connected with said holder for moving the first mentioned means to prevent such shifting of said holder from affecting the action of said thermostat.

2. In an arc light, a thermostat, an electrode holder adjustably mounted with respect to said thermostat, means controlled by said thermostat in response to burning away of the positive electrode for feeding said electrode through said holder, and means connected with said holder for preventing the adjustment of said holder with respect to said thermostat from affecting the action of said thermostat.

3. In an arc light, an electrode holder, means for feeding an electrode through said holder, means responsive to the radiant energy received from the arc for controlling said feeding means, a support upon which said holder is mounted for movement with respect to said second-mentioned means, means for focusing a beam from the arc on said second named means, a pivotal mounting for said last named means, and means connecting said mounting with said holder.

4. In an arc light, an electrode holder, a drum in which said holder is adjustably mounted, a thermostat mounted on said drum, means controlled by said thermostat in response to burning away of the positive electrode for feeding an electrode through said holder, and means for preventing the adjustment of said holder with respect to said thermostat from affecting the feeding of said electrode.

5. In an arc light, an electrode holder, a drum in which said holder is adjustably mounted, a thermostat on said drum, means controlled by said thermostat for feeding an electrode through said holder in response to change in position of the arcing tip of said electrode, and means connected with said holder for preventing the adjusting of said holder with respect to said thermostat from affecting the action of said thermostat.

6. In a light projecting apparatus, an electrode holder, a support therefor, a thermostat carried by said support, means for directing a beam of light from the crater of the positive electrode upon said thermostat, means controlled by said thermostat for feeding the positive electrode through said holder in response to the burning away of said electrode, means for shifting said holder with respect to said thermostat, and means connecting said holder and said first mentioned means for shifting the latter when said holder is moved with respect to said support.

7. In a light projecting apparatus, an electrode holder, a support therefor, a thermostat carried by said support, means for directing a beam of light from the crater of the positive electrode upon said thermostat, means controlled by said thermostat for feeding the positive electrode through said holder in response to the burning away of said electrode, means for shifting said holder with respect to said thermostat, and means for preventing said shifting of said holder from varying the effect of said beam upon said thermostat.

8. In a light projecting apparatus, a thermostat, a holder for an electrode, said holder being mounted for adjustment with respect to said thermostat, and means for maintaining the tip of said electrode at a given distance from said holder in any of a plurality of positions of said holder with respect to said thermostat.

9. In a light projecting apparatus, a support, an electrode holder adjustably mounted thereon, means responsive to the position of a beam of light from the crater of the positive electrode for controlling the feeding of said electrode through said holder, means for directing a beam of light from said crater upon said first named means, and means for preventing an adjustment of the position of said holder with respect to said first named means from varying the effect of said beam upon said first named means.

10. In a light projecting apparatus, a support, an electrode holder adjustably mounted thereon, a thermostat carried by said support, means for directing a beam of light from the crater of the positive electrode upon said thermostat, means controlled by said thermostat for feeding the positive electrode through said holder, and means connecting said holder and said first named means for maintaining said beam directed upon said thermostat in any of a plurality of positions of said holder with respect to said thermostat.

11. In an arc light, an electrode holder, means for feeding an electrode through said holder, power means, an element movable to a position for actuating said feeding means, a movable member connected with said element, an electro-magnet for moving said member into position for actuation by said power means, a thermostat for closing a circuit through said electro-magnet, means for directing a beam of light upon said thermostat to cause the closing of a circuit through said electro-magnet in response to the burning away of said electrode, and means for preventing the adjustment of said holder with respect to said thermostat from affecting the operation of the latter.

12. In an arc light, a projector, an electrode holder adjustably mounted with respect to said projector, means for feeding an electrode through said holder, an element movable to a position for governing said feeding means, power means, means disconnected from said holder and responsive to the radiant energy received from said electrode for causing said power means to move said element to said position, and means for focusing a beam on said last named means, and a mounting for said focusing means pivoted at one end to said holder and at the other end adjacent said first named means.

13. In a light projecting apparatus, a thermostat, a holder for an electrode, said holder being mounted for adjustment with respect to said thermostat, a pivotally mounted light concentrating device for concentrating a beam on the thermostat, and means connecting said device with said holder for the purpose specified.

14. In an arc searchlight having a drum, an electrode holder adjustably mounted in the drum, a thermostat on said drum for controlling the feed, a lense for concentrating a beam from the arc on said thermostat, and a mounting for said lens which is pivoted adjacent the thermostat to said drum and adjacent the arc to said holder.

In testimony whereof I have affixed my signature.

MARTIN L. PATTERSON.